United States Patent

Robb et al.

Patent Number: 5,906,760
Date of Patent: May 25, 1999

[54] EXHAUST SYSTEM FOR A LASER CUTTING DEVICE

[76] Inventors: David K. Robb, 1101 Granville Rd., Charlotte, N.C. 28207; Vladislav V. Zolotov; Alexander S. Volkov, both of 19 Kurchatova St., 191028 St. Petersburg, Russian Federation

[21] Appl. No.: 08/963,779
[22] Filed: Nov. 4, 1997
[51] Int. Cl.$^6$ .......................... B23K 26/14; B23K 26/16
[52] U.S. Cl. .................................. 219/121.67; 219/121.84
[58] Field of Search .................... 219/121.84, 121.68, 219/121.67, 121.72, 121.69

[56] References Cited

U.S. PATENT DOCUMENTS

| | | |
|---|---|---|
| 3,612,814 | 10/1971 | Houldcroft . |
| 3,784,183 | 1/1974 | Castro et al. . |
| 3,866,398 | 2/1975 | Vernon, Jr. et al. . |
| 4,149,062 | 4/1979 | Limmer et al. . |
| 4,659,902 | 4/1987 | Swensrud et al. ............. 219/121.84 |
| 4,680,442 | 7/1987 | Bauer et al. . |
| 4,942,284 | 7/1990 | Etcheparre et al. . |
| 5,227,606 | 7/1993 | Weeks et al. ................. 219/121.84 |
| 5,250,784 | 10/1993 | Muller et al. ................. 219/121.72 |
| 5,362,941 | 11/1994 | Johnson et al. . |
| 5,504,301 | 4/1996 | Eveland . |
| 5,811,753 | 9/1998 | Weick et al. ................. 219/121.67 |

FOREIGN PATENT DOCUMENTS

| | | | |
|---|---|---|---|
| 62-187590 | 8/1987 | Japan | 219/121.84 |
| 63-63596 | 3/1988 | Japan | 219/121.84 |
| 63-295091 | 12/1988 | Japan | 219/121.84 |
| 2-99293 | 4/1990 | Japan | 219/121.84 |

*Primary Examiner*—Geoffrey S. Evans
*Attorney, Agent, or Firm*—Adams Law Firm, P.A.

[57] ABSTRACT

An exhaust system and method are adapted for use in a laser cutting device. The cutting device includes a base having a working surface for supporting a work piece thereon. A laser plotter head is mounted for movement over the working surface of the base. A laser communicates with the plotter head and directs a work piece cutting laser beam onto the work piece on the working surface. The exhaust system includes a multiplicity of exhaust ports formed in the working surface of the base. A manifold cooperates with an underside of the base and in substantially sealed fluid communication with the multiplicity of exhaust ports in the working surface. An elongated, flexible exhaust hose is connected at its first end to the manifold and at its second end to the laser plotter head. The second end is directed towards the work piece on the working surface and movable in unison with the movement of the plotter head. A vacuum is connected to the manifold for simultaneously drawing air inwardly through the exhaust ports in the working surface and through the exhaust hose. Fumes generated during operation of the laser are thereby simultaneously exhausted from an area above and below the work piece.

13 Claims, 2 Drawing Sheets

EXHAUST SYSTEM FOR A LASER CUTTING DEVICE

TECHNICAL FILED AND BACKGROUND OF THE INVENTION

This invention relates to an exhaust system for a laser cutting device. The laser cutting device is particularly applicable for cutting designs, logos, and signatures in sheet material such as report covers, pocket folders, stationary, business cards, brochures, invitations, and greeting cards, and provides a convenient alternative to stamping, embossing, and conventional decorative die cutting. The invention quickly and efficiently removes smoke and fumes generated during operation of the laser from an area proximate the sheet material being cut.

In some prior art laser cutting devices, exhaust systems are provided which attempt to exhaust these fumes downwardly through openings in the cutting table. These type of systems are generally ineffective at the point of contact between the laser beam and the work piece being cut, since the work piece itself obstructs the flow of air through the nearest openings in the cutting table. Other systems utilize a top cover arranged over the laser cutting device and cutting table, and a widely distributed upper vacuum to remove the smoke and fumes from an area above the work piece. These systems are likewise ineffective and do not properly exhaust fumes from directly beneath the work piece during cutting. Unless properly exhausted, these fumes can scorch and stain the underside of the work piece, and will contaminate the laser optic over a relatively short period of use.

The present invention addresses these and other drawbacks and limitations of the prior art by providing an exhaust system for a laser cutting device which simultaneously removes smoke and fumes generated by the laser during cutting from an area directly above and below the work piece being cut. The invention includes a number of exhaust ports formed in the cutting table which cooperate with a vacuum source to draw smoke and fumes downwardly away from the sheet material to prevent scorching and staining of the sheet material. The invention further includes a traveling localized vacuum for drawing smoke and fumes vertically upwardly away from the sheet material during cutting operations to prevent contamination of the laser optic. The exhaust ports and localized vacuum communicate with a single vacuum source for practical and efficient operation.

SUMMARY OF THE INVENTION

Therefore, it is an object of the invention to provide an exhaust system for a laser cutting device which simultaneously removes smoke and fumes generated by the laser during cutting from an area directly above and below the work piece being cut.

It is another object of the invention to provide an exhaust system for a laser cutting device which includes a traveling localized vacuum arranged directly over the work piece during cutting to protect the laser optic from contamination caused by smoke and fumes.

It is another object of the invention to provide an exhaust system for a laser cutting device which cooperates with a vacuum source to prevent scorching and staining of the underside of the work piece.

It is another object of the invention to provide an exhaust system for a laser cutting device which utilizes only a single vacuum pump.

These and other objects of the present invention are achieved in the preferred embodiments disclosed below by providing an exhaust system adapted for use in a laser cutting device. The cutting device includes a base having a working surface for supporting a work piece thereon. A laser plotter head is mounted for movement over the working surface of the base. A laser communicates with the plotter head for directing a work piece cutting laser beam onto the work piece on the working surface. The exhaust system operates to exhaust fumes generated during operation of the laser from an area proximate the work piece.

The exhaust system includes a multiplicity of exhaust ports formed in the working surface of the base. A manifold cooperates with an underside of the base and in substantially sealed fluid communication with the multiplicity of exhaust ports in the working surface. An elongated, flexible exhaust hose is connected at its first end to the manifold and at its second end to the laser plotter head. The second end is directed towards the work piece on the working surface and movable in unison with the movement of the plotter head. Vacuum means are connected to the manifold for simultaneously drawing air inwardly through the exhaust ports in the working surface and through the exhaust hose. Fumes generated during operation of the laser are thereby simultaneously exhausted from an area above and below the work piece.

According to one preferred embodiment of the invention, the vacuum means includes a second elongated flexible hose connected to the manifold and to a vacuum source.

According to another preferred embodiment of the invention, the vacuum source includes a vacuum pump.

According to yet another preferred embodiment of the invention, vacuum adjustment means are provided for controlling operation of the vacuum pump.

According to yet another preferred embodiment of the invention, the exhaust ports cover substantially the entire area of the working surface.

According to yet another preferred embodiment of the invention, the working surface includes approximately 2–4 of the exhaust ports per square inch.

A further aspect of the invention relates to a method for exhausting fumes generated during operation of a laser cutting device from an area proximate a work piece supported on a working surface of a work base. The laser cutting device includes a laser plotter head mounted for movement over the working surface of the base. A laser communicates with the plotter head for directing a work piece cutting laser beam onto the work piece on the working surface. The method includes the steps of forming a multiplicity of exhaust ports in the working surface of the base. A manifold cooperates with an underside of the base and in substantially sealed fluid communication with the multiplicity of exhaust ports in the working surface. A first end of an elongated, flexible exhaust hose is connected to the manifold and its second end connected to the laser plotter head. The second end is directed towards the work piece on the working surface and movable in unison with the movement of the plotter head. A vacuum means is connected to the manifold for simultaneously drawing air inwardly through the exhaust ports in the working surface and through the exhaust hose. Fumes generated during operation of the laser are simultaneously exhausted from an area above and below the work piece.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
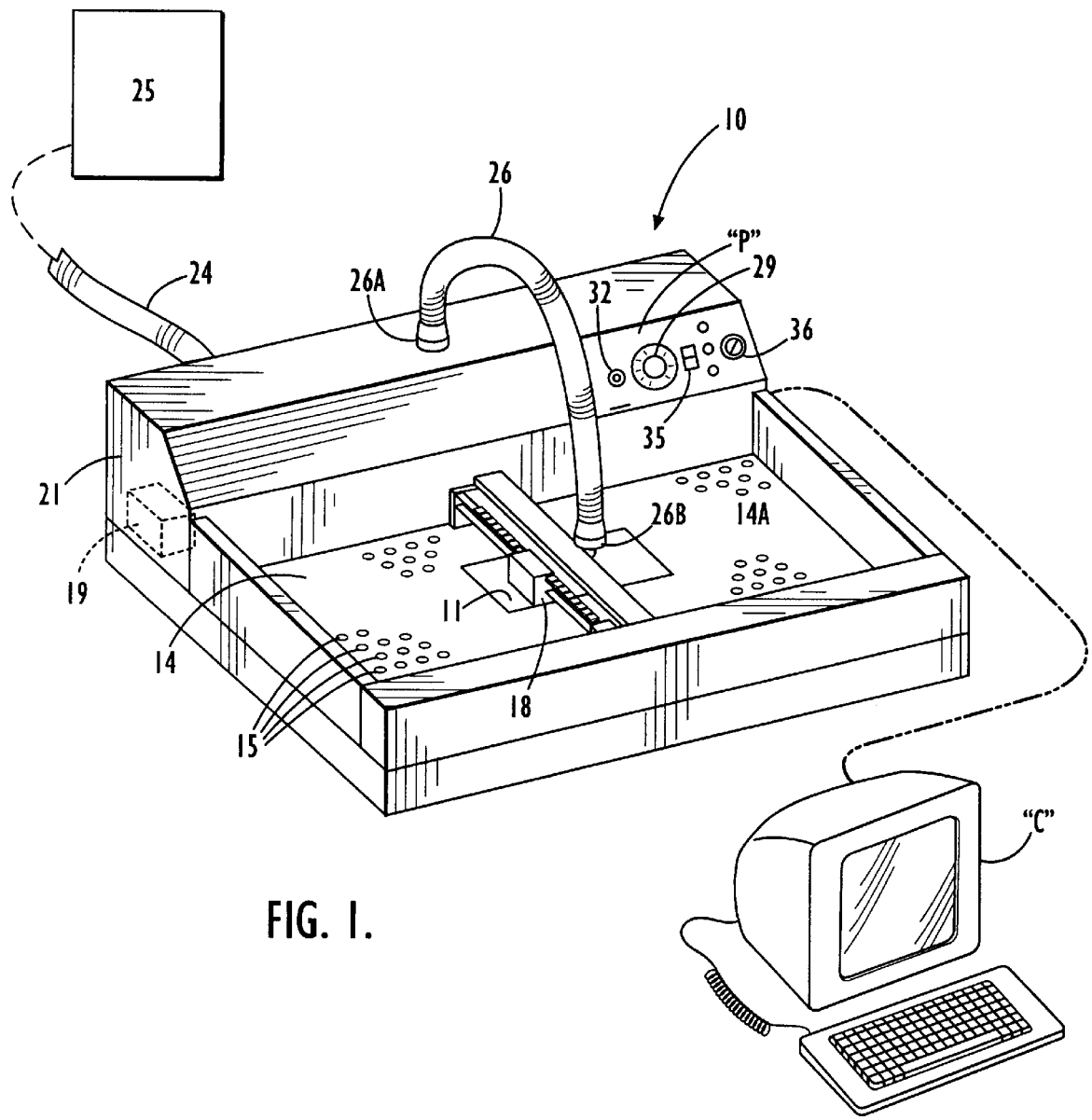
FIG. 1 is a perspective view of a laser cutting device incorporating an exhaust assembly according to one preferred embodiment of the invention.

Referring now specifically to the drawings, a laser cutting device incorporating an exhaust system according to the present invention is illustrated in FIG. 1 and shown generally at reference numeral 10. The laser cutting device 10 is operated through a standard personal computer "C" utilizing menu-driven software developed by LaserDraw, Inc. of Charlotte, N.C. The cutting device 10 is particularly applicable for cutting designs, logos, and signatures in sheet material 11 such as report covers, pocket folders, stationary, business cards, brochures, invitations, greeting cards, plywood, and the like. The design is first loaded into the computer "C" from a disk or scanner, or created directly on-screen by the user. The computer "C" then relays control commands to the laser cutting device 10. The laser cutting device 10 cuts the design into the sheet material 11, as described further below.

The term "cut" is used broadly herein to include any penetration of the surface of the sheet material 11 by the laser including engraving, embossing, and other surface processing. The sheet material 11 may be paper, plastic, fabric, wood, or metal. Several layers of sheet material 11 may be cut at one time.

Figure 2:
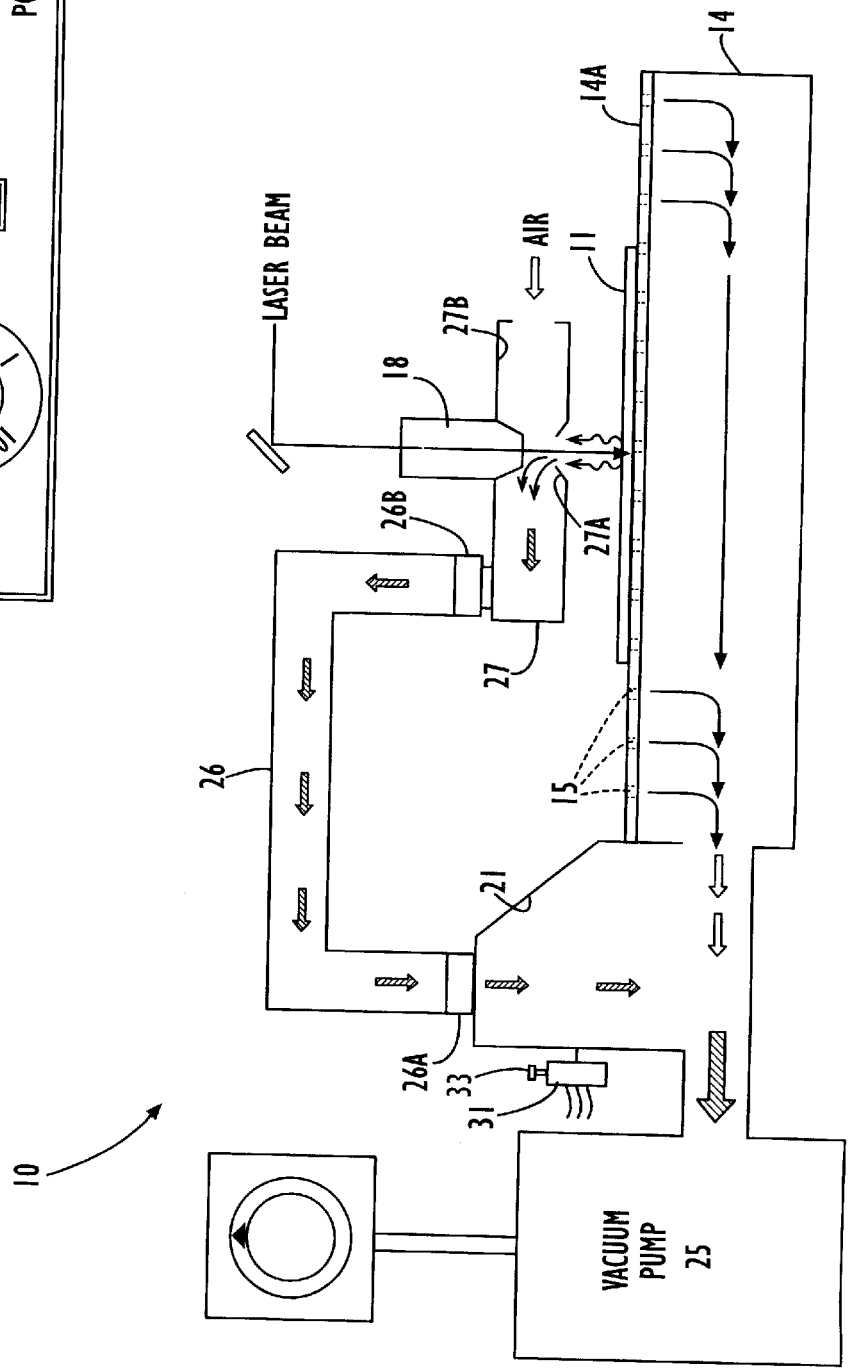
FIG. 2 is a schematic cross-sectional view of the laser cutting device illustrating the exhaust flow path of fumes generated during laser cutting of the sheet material.

As shown in FIGS. 1 and 2, the laser cutting device 10 includes a vacuum table 14 defining a cutting base having a working surface 14A for carrying the sheet material 11, a number of exhaust ports 15 formed in the vacuum table 14, a traveling laser plotter head 18 including a laser optic (not shown) mounted for movement over the working surface 14A, and a laser 19. The laser 19 communicates with the plotter head 18 through mirrors to direct a laser cutting beam downwardly onto the sheet material 11. The laser plotter head 18 moves over the working surface 14A in a manner similar to standard X-Y plotter heads, and is controlled and monitored by the computer "C". According to one embodiment, the laser cutting device 10 uses a 10,600 nm carbon dioxide laser with a TEMOO continuous wave beam. The laser delivers 10 watts of energy.

Exhaust System

The present exhaust system is provided for quickly removing the smoke and fumes generated during operation of the laser 19 from an area proximate the laser optic and the sheet material 11 being cut. The exhaust system includes a manifold 21 connected to the rear of the vacuum table 14, and in substantially sealed communication with the exhaust ports 15 from an underside of the working surface 14A. The exhaust ports 15 preferably cover the entire area of the working surface 14A at a ratio of about 2–4 ports per square inch. In one embodiment, the dimension of the vacuum table 14 is 20×26 inches including approximately 1600 equally spaced exhaust ports 15. The vacuum table 14 is preferably marked off in units for allowing convenient measurement when cutting the sheet material 11.

The exhaust system further includes a first open-ended elongated flexible hose 24 connected a vacuum pump 25 and to a back wall of the manifold 21. A second open-ended flexible hose 26 is connected at one end 26A to a top wall of the manifold and at its opposite end 26B to the traveling laser plotter head 18. The open end 26B of the hose 26 is positioned to receive smoke and fumes from a localized area directly above the sheet material 11 being cut, and is moveable in unison with the laser plotter head 18 over the working surface 14A.

As shown in FIG. 2, a horizontal air-accelerator tube 27 is attached to the laser plotter head 18 and communicates with the second end 26B of the hose 26. The tube 27 includes a bottom opening 27A through which the laser beam extends to the sheet material 11, and an open side 27B. The horizontal tube 27 cooperates with the vacuum pressure supplied by the pump 25 to create a high-velocity laminar air flow across the vacuum table 14, and to accelerate the air flow upwardly through the flexible hose 26. The smoke and fumes generated during cutting become entrained in the air flow, and quickly drawn away from the sheet material 11 being cut and away from the laser optic housed within the plotter head 18.

The air flow path through the horizontal tube 27, the hose 26, and the exhaust ports 15 into the manifold 21 and through the hose 24 is shown in FIG. 2. Preferably, the downward vacuum force created by the pump 25 through the exhaust ports 15 is slightly greater than the localized vacuum through the horizontal tube 27 and hose 26 such that relatively light weight or delicate sheet material 11 will remain in position on the vacuum table 14 during laser cutting. According to one embodiment, the diameter of each hose 24 and 26 is approximately 1.5 inches, and the diameter of each exhaust port 15 about 0.1 inch. The tube 27 is preferably about 3 inches long, and has a square cross-section. The side opening 27B in the tube 27 is about 1 inch tall and about 1.5 inches wide. The diameter of the bottom opening 27A is about 0.5 inches.

Figure 3:
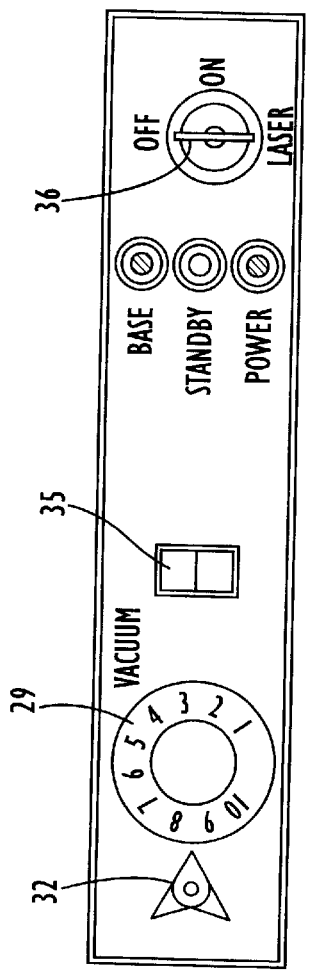
FIG. 3 is an enlarged view of the front control panel.

As shown in FIG. 3, a manually adjustable control knob 29 is provided on a front panel "P" of the device 10 for adjusting the strength of the vacuum pump 25. The negative pressure pulled by the vacuum pump 25 is preferably adjustable from between 1 and 10 inches (Hg). The control knob has settings labeled "1–10" which correspond, respectively, to a given level of vacuum pressure. Setting "1"corresponds to a vacuum pressure of approximately 1–3 inches (Hg). Setting "5" corresponds to a vacuum pressure of approximately 4–6 inches (Hg). Setting "10" corresponds to a vacuum pressure of approximately 7–10 inches (Hg). Higher settings are preferable when cutting several sheets of material at one time or thicker material, such as wood. The vacuum pump 25 preferably includes a replaceable 115 V, 1 HP motor and a fine particle filter.

An optimal, predetermined level of vacuum pressure has been calculated through testing and is monitored using a vacuum sensor 31 with electrical leads extending to a controller (not shown). When the vacuum drops below the optimal level, a green LED indicator light 32 located on the front panel turns off and a warning flashes on the display screen of the computer "C" to prompt the user to increase the vacuum setting using the control knob 29. This optimal level is manually adjustable if necessary using a tuning screw 33 connected to the vacuum sensor 31. In an alternative embodiment, the system includes means for automatically adjusting the vacuum pressure as required.

Operation of the Laser Cutting Device 10

To operate the laser cutting device 10, the user first inputs the design into the computer "C", as described above. The sheet material 11 is then placed on the working surface 14A over the exhaust ports 15 formed in the vacuum table 14. The vacuum pump 25 is activated by pressing switch 35. The transient laser intensity and running laser intensity are input by the user into the computer "C". The laser 19 is activated by turning switch 36 to the "On" position. The computer "C" directs the traveling laser plotter head 18 as the selected design is cut into the sheet material 11. The vacuum sensor 31 monitors the vacuum pressure, as described above. Fans (not shown) are preferably located adjacent to the manifold 21 at the rear of the vacuum table 14 to cool the laser 19 during cutting operations.

During cutting, smoke and fumes generated by the laser 19 become entrained in the surrounding air, and are simultaneously pulled downwardly through the exhaust ports 15 in the vacuum table 14 and upwardly though the flexible hose 26. The horizontal tube 27 accelerates air flow into the open end 26B of the hose 26, and provides a traveling localized vacuum following the path of the plotter head 18 immediately adjacent to the sheet material 11 being cut. This localized vacuum effectively and efficiently removes the surrounding smoke and fumes, while moving a relatively low volume of air and requiring relatively little pump capacity. When cutting multiple overlying sheets of material 11, the localized vacuum cooperates with the ambient air pressure acting on the vacuum table 14 and sheet material 11 in an area surrounding the cut to draw the sheets together and prevent the flow of smoke and fumes between the sheets.

According to one embodiment, the vacuum generated in the space between the sheet material 11 and plotter head 18 is about 0.5–5 mm of water pole, and that within the flexible hose 26 about 5–50 mm of water pole. The vacuum generated within the vacuum table 14 is in the range of 10–100 mm of water pole.

In addition to the above, the exhaust system is applicable for use in combination with other laser cutting devices such as those used for laser cutting three-dimensional work pieces. The exhaust system is further applicable to any other devices generating fumes or particulate matter requiring fast and efficient removal from an area proximate the work piece.

An exhaust system for a laser cutting device is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. In combination with a laser cutting device including a base having a working surface for supporting a work piece thereon, a laser plotter head mounted for movement over the working surface of the base, and a laser communicating with the plotter head for directing a work piece cutting laser beam onto the work piece on the working surface, and an exhaust system for exhausting fumes generated during operation of the laser from an area proximate the work piece, said exhaust system comprising:

(a) a multiplicity of exhaust ports formed in the working surface of the base;
   (b) a manifold cooperating with an underside of the base and in substantially sealed fluid communication with the multiplicity of exhaust ports in the working surface;
   (c) an elongated, flexible exhaust hose connected at a first end thereof to the manifold and at a second end thereof to the laser plotter head, the second end being directed towards the work piece on the working surface and movable in unison with the movement of the plotter head; and
   (d) vacuum means connected to the manifold for simultaneously drawing air inwardly through the exhaust ports in the working surface and through the exhaust hose, whereby fumes generated during operation of the laser are simultaneously exhausted from an area above and below the work piece.

2. A combination according to claim 1, wherein said vacuum means comprises second elongated flexible hose connected to the manifold and to a vacuum source.

3. A combination according to claim 2, wherein said vacuum source comprises a vacuum pump.

4. A combination according to claim 3, and including vacuum adjustment means for controlling operation of the vacuum pump.

5. A combination according to claim 1, wherein the exhaust ports cover substantially the entire area of the working surface.

6. A combination according to claim 1, wherein the working surface includes approximately 2–4 of said exhaust ports per square inch.

7. An exhaust system adapted for use in a laser cutting device including a base having a working surface for supporting a work piece thereon, a laser plotter head mounted for movement over the working surface of the base, and a laser communicating with the plotter head for directing a work piece cutting laser beam onto the work piece on the working surface, said exhaust system operating to exhaust fumes generated during operation of the laser from an area proximate the work piece, and comprising:

(a) a multiplicity of exhaust ports formed in the working surface of the base;
   (b) a manifold cooperating with an underside of the base and in substantially sealed fluid communication with the multiplicity of exhaust ports in the working surface;
   (c) an elongated, flexible exhaust hose connected at a first end thereof to the manifold and at a second end thereof to the laser plotter head, the second end being directed towards the work piece on the working surface and movable in unison with the movement of the plotter head; and
   (d) vacuum means connected to the manifold for simultaneously drawing air inwardly through the exhaust ports in the working surface and through the exhaust hose, whereby fumes generated during operation of the laser are simultaneously exhausted from an area above and below the work piece.

8. An exhaust system according to claim 7, wherein said vacuum means comprises a second elongated flexible hose connected to the manifold and to a vacuum source.

9. An exhaust system according to claim 8, wherein said vacuum source comprises a vacuum pump.

10. An exhaust system according to claim 9, and including vacuum adjustment means for controlling operation of the vacuum pump.

11. An exhaust system according to claim 7, wherein the exhaust ports cover substantially the entire area of the working surface.

12. An exhaust system according to claim 7, wherein the working surface includes approximately 2–4 of said exhaust ports per square inch.

13. A method for exhausting fumes generated during operation of a laser cutting device from an area proximate a work piece supported on a working surface of a work base, the laser cutting device including a laser plotter head mounted for movement over the working surface of the base, and a laser communicating with the plotter head for directing a work piece cutting laser beam onto the work piece on the working surface, the method comprising the steps of:

(a) forming a multiplicity of exhaust ports in the working surface of the base;

(b) providing a manifold cooperating with an underside of the base and in substantially sealed fluid communication with the multiplicity of exhaust ports in the working surface;

(c) connecting a first end of an elongated, flexible exhaust hose to the manifold and a second end thereof to the laser plotter head, the second end being directed towards the work piece on the working surface and movable in unison with the movement of the plotter head; and (d) connecting vacuum means to the manifold for simultaneously drawing air inwardly through the exhaust ports in the working surface and through the exhaust hose, whereby fumes generated during operation of the laser are simultaneously exhausted from an area above and below the work piece.

* * * * *